No. 696,760. Patented Apr. 1, 1902.
D. SCHUURMAN.
FEED BAG.
(Application filed Dec. 23, 1901.)
(No Model.)
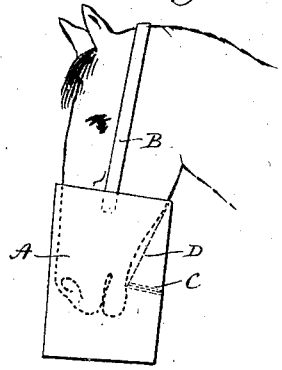
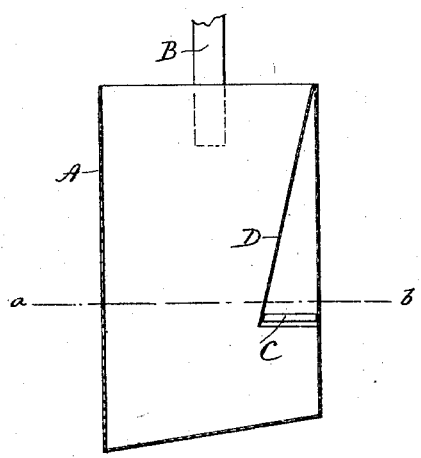
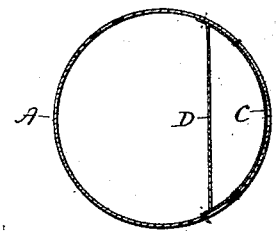
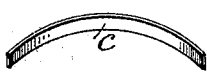
Witnesses.
C. L. Weed.
Dirk Schuurman
Inventor.
By atty Seymour Hoare
THE NORRIS PETERS CO., PHOTO-LITHO., WASHINGTON, D. C.

UNITED STATES PATENT OFFICE.

DIRK SCHUURMAN, OF HOBOKEN, NEW JERSEY.

FEED-BAG.

SPECIFICATION forming part of Letters Patent No. 696,760, dated April 1, 1902.

Application filed December 23, 1901. Serial No. 86,899. (No model.)

*To all whom it may concern:*

Be it known that I, DIRK SCHUURMAN, of Hoboken, in the county of Hudson and State of New Jersey, have invented a new and useful Improvement in Feed-Bags; and I do hereby declare the following, when taken in connection with the accompanying drawings and the letters of reference marked thereon, to be a full, clear, and exact description of the same, and which said drawings constitute part of this specification and represent, in—

Figure 1, a side view of a feed-bag constructed in accordance with my invention as applied to the head of a horse; Fig. 2, an enlarged longitudinal sectional view thereof; Fig. 3, a transverse sectional view on the lines *a b* of Fig. 2; Fig. 4, a perspective view of the spreader detached.

This invention relates to an improvement in feed-bags, or, as they are sometimes called, "nose-bags"—that is, a bag adapted to contain feed and into which the nose of a horse may be inserted, the bag being suspended from its head.

As is well known, horses while feeding are very apt to toss the head upward, and thereby throw the feed out of the bag. The object of this invention is to provide a guard within the bag, the edge of which guard will closely fit about the under jaw of the horse and form a receptacle into which the feed will pass when the head is tossed upward.

As herein shown, the bag A is of substantially usual construction and provided with a strap B, by which it is suspended from the head of a horse. At the rear of the bag and between its upper and lower ends is a spreader C, formed from spring metal, wood, or other suitable material and longitudinally bowed. This spreader is secured either to the outside or inside of the bag and tends to hold its sides expanded. Within the bag, secured to the upper end thereof, is a guard or shield D, of canvas or other suitable material corresponding to the material from which the bag is formed. This shield extends downward into line with the spreader, the corners of the shield terminating at a point adjacent to the ends of the spreader, the width of the guard at its lower end being about the same as the diameter of the bag. The spreader C, holding the sides of the bag expanded, draws the lower edge of the shield or guard into substantially a straight line or causes it to closely hug the under jaw of the animal feeding and forms a pocket into which the feed will pass when the horse tosses its head upward, and thereby prevents feed escaping from the bag.

I am aware that feed-bags have been provided with pockets or receptacles adapted to contain the feed and which open into the bag at the lower end thereof, so that but a small portion of the feed will be delivered at a time, and this pocket may in a measure prevent the escape of feed when the bag is tossed; but my improvement does not interfere with the space at the bottom of the bag, so that the animal can feed without interference. It simply provides a shield above its mouth which prevents the escape of feed when the bag is tossed upward.

I am also aware that feed-bags have been provided at their upper ends with guards adapted to partially close the same, and therefore do not wish to be understood as claiming such is my invention.

Having fully described my invention, what I claim as new, and desire to secure by Letters Patent, is—

The combination with a feed-bag, of a transversely-arranged bowed spreader secured to the rear wall of the bag near the lower end thereof, and a shield secured at its upper end to the upper rear edge of said bag, at its sides with the sides of the bag and extending downward into line with the said spreader whereby the lower end of the guard is held away from the rear wall of the bag, substantially as described.

In testimony whereof I have signed this specification in the presence of two subscribing witnesses.

DIRK SCHUURMAN.

Witnesses:
MAX BORCHARDT,
HENDRIK HOFFMAN.